United States Patent
Hirose

(10) Patent No.: US 6,618,989 B2
(45) Date of Patent: Sep. 16, 2003

(54) METHOD FOR GROWING ORNAMENTAL PLANTS BY HYDROPONIC CULTIVATION AND AN APPARATUS THEREFOR

(75) Inventor: Mitsuru Hirose, Chiba (JP)

(73) Assignee: Hirose Co., Ltd., Narashino (JP)

( * ) Notice: Subject to any disclaimer, the term of this patent is extended or adjusted under 35 U.S.C. 154(b) by 0 days.

(21) Appl. No.: 09/858,683

(22) Filed: May 16, 2001

(65) Prior Publication Data

US 2001/0047616 A1 Dec. 6, 2001

(30) Foreign Application Priority Data

| May 26, 2000 | (JP) | 2000-156621 |
| Sep. 26, 2000 | (JP) | 2000-291378 |
| Sep. 4, 2000 | (JP) | 2000-266696 |

(51) Int. Cl.[7] .......................... A01G 31/00; A01G 9/02; A01K 63/00
(52) U.S. Cl. .......................... 47/59; 119/245; 119/246; 119/247; 119/200; 47/62 R; 47/69; 47/79; 47/80; 47/64
(58) Field of Search .............. 47/69, 79, 80, 47/81, 82, 59, 60, 62 R, 63, 64, 58.1, 41.13, 41.01, 65, 4, 62 E, 67, 74; 119/245, 246, 247, 253, 255, 256, 269, 200, 207, 215, 221

(56) References Cited

U.S. PATENT DOCUMENTS

| 3,018,586 A | * | 1/1962 | Farley | |
| 4,114,316 A | * | 9/1978 | Cohen | 47/64 |
| 4,211,034 A | * | 7/1980 | Piesner | 47/62 |
| 4,691,472 A | * | 9/1987 | Makara | 47/58 |
| 5,152,808 A | | 10/1992 | Blok | |
| 5,571,409 A | * | 11/1996 | Scarborough | 210/169 |
| 5,867,938 A | * | 2/1999 | DiLernia | 47/65.5 |
| 5,927,003 A | * | 7/1999 | Miller et al. | 47/58 |
| 6,006,471 A | * | 12/1999 | Sun | 47/69 |
| 6,086,755 A | * | 7/2000 | Tepper | 210/150 |
| 6,112,459 A | * | 9/2000 | Hirose | 47/59 |
| 6,149,991 A | * | 11/2000 | Okuda | 428/13 |

FOREIGN PATENT DOCUMENTS

| GB | 2256119 A | * | 12/1992 | A01K/63/00 |
| JP | 04-104746 | * | 4/1992 | A01K/63/00 |
| JP | 08-000094 | * | 9/1996 | A01G/9/00 |

OTHER PUBLICATIONS www.1888orchids.com, 1 page, Welcome to our orchid moss selections.*
www.aquabotanic.com/rug.htm, 2 pages, Riccia rocks, caves and wood.*
www.tropica.com/article_fullscreen.asp?type=aquaristic&id=468, 2 pages, Aquaristic.*
Orchid Growing Basics, Dr. Gustav Schoser, 1993, 4 pages.*

* cited by examiner

Primary Examiner—Peter M. Poon
Assistant Examiner—Andrea M. Valenti
(74) Attorney, Agent, or Firm—Richard M. Goldberg

(57) ABSTRACT

A method for growing ornamental plants by hydroponic cultivation, includes the steps of arranging a piece of a tree in a water tank, adhering support members to the tree, the support members being water permeable which are free to deform, placing plants on the support members, the roots of the plants being integrated with the soil, and supplying water to the support members so as to implement hydroponic cultivation of the plants on the tree.

9 Claims, 5 Drawing Sheets

METHOD FOR GROWING ORNAMENTAL PLANTS BY HYDROPONIC CULTIVATION AND AN APPARATUS THEREFOR

BACKGROUND OF THE INVENTION

The present invention relates to a method and an apparatus in which a piece of a tree is placed in a water tank for growing plants (most of which are garden plants), which also serve as ornamental plants and arranging the piece of the tree for hydroponic cultivation.

A method for growing ornamental plants is provided involving placing a piece of a tree in a water tank to create the taste of the nature therein which has been employed among hydroponic cultivation hobbyists.

In conventional methods for growing ornamental plants, apart from a piece of a tree, the plants were grown with the roots thereof extended into the sand in the bottom of the tank.

However, such a method for growing plants that allows a piece of a tree and plants to simply exist in the same tank is usually not good enough to provide an ornamental effect.

The object of the present invention is to provide a method for growing ornamental plants by hydroponic cultivation and an apparatus therefor which overcomes the usual inadequate ornamental effect provided by and characterizing the prior art as described above.

At the same time, another object of the present invention is to provide a construction for growing plants by means of hydroponic cultivation wherein the plants and the tree are integrated with each other.

SUMMARY OF THE INVENTION

In order to achieve the desired aforementioned objects, the present invention comprises:

(1) a method for growing ornamental plants by hydroponic cultivation comprising the steps of arranging a piece of a tree in a water tank; adhering support members to the tree, the support members being water permeable and free to deform; placing plants on the support members, the roots of the plants being integrated with soil, and supplying water so that the level of water becomes equal to or lower than that of the support members, thereby enabling the realization of the hydroponic cultivation of the plants on the tree, and (2) an apparatus used for growing ornamental plants by hydroponic cultivation, which allows a piece of a tree to be arranged in a water tank and support members to be adhered to the tree, the support members being water permeable and free to deform, thereby making it possible to realize the growing of plants by hydroponic cultivation on the piece of a tree.

DETAILED DESCRIPTION OF THE INVENTION

The aforementioned method provides for growing ornamental plants by hydroponic cultivation according to the present invention, while the aforementioned apparatus is used for the aforementioned method.

The process for implementing the aforementioned method is described in accordance with the accompanying drawings.

Figure 1:
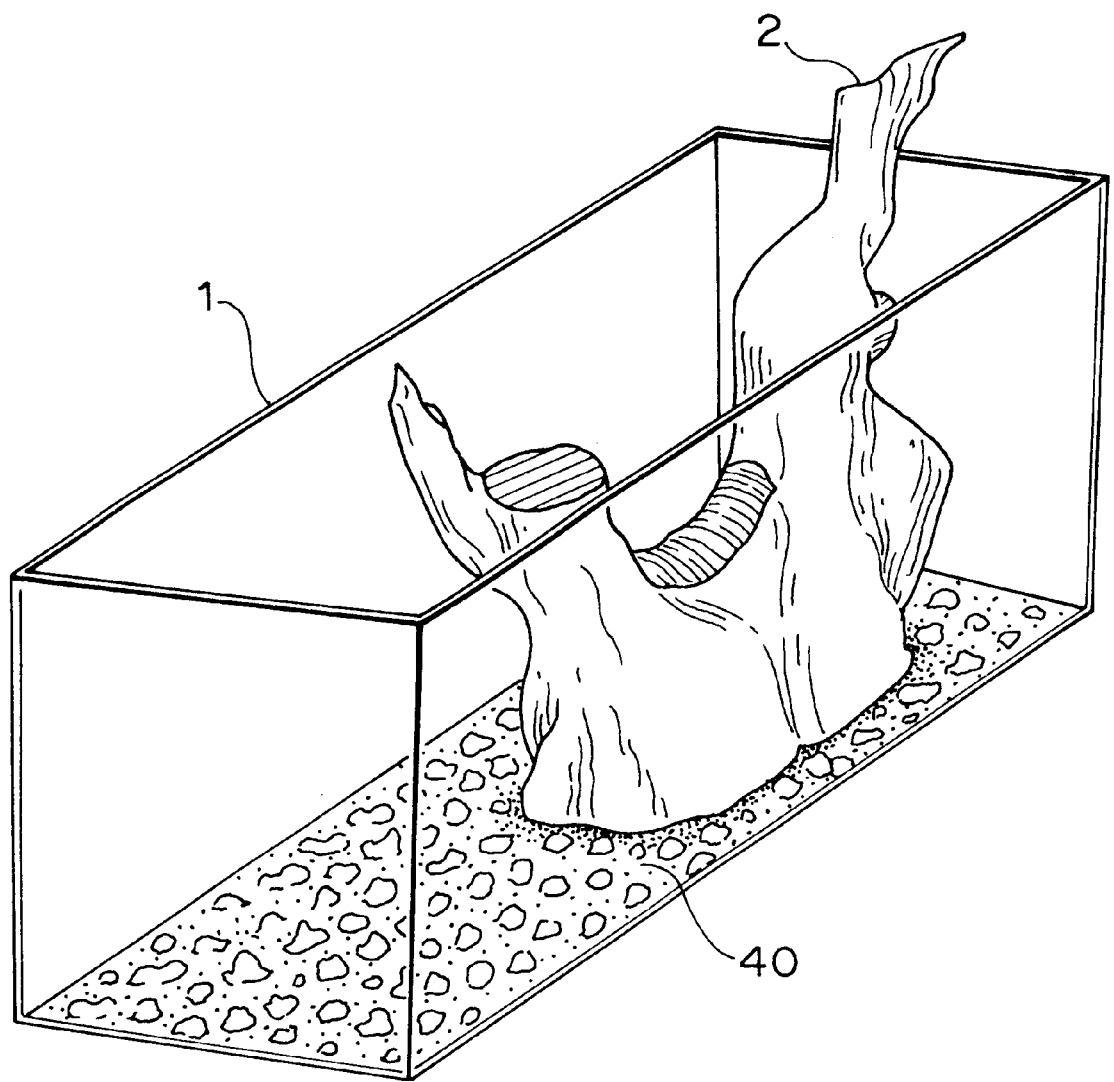
FIG. 1 is a perspective view illustrating a piece of a tree placed in a water tank.

As the first step, as shown in FIG. 1, a piece of a tree 2 is arranged in a water tank 1.

In this case, it is not necessarily required to place bottom floor sand 40 in the tank 1.

However, plants can be grown safely by hydroponic cultivation using the bottom floor sand 40.

Incidentally, although said piece of a tree 2 is not limited to a particular type, natural driftwood (natural wood floating in rivers) is suitable for appreciation purposes since it has a variety of shapes.

Figure 2:
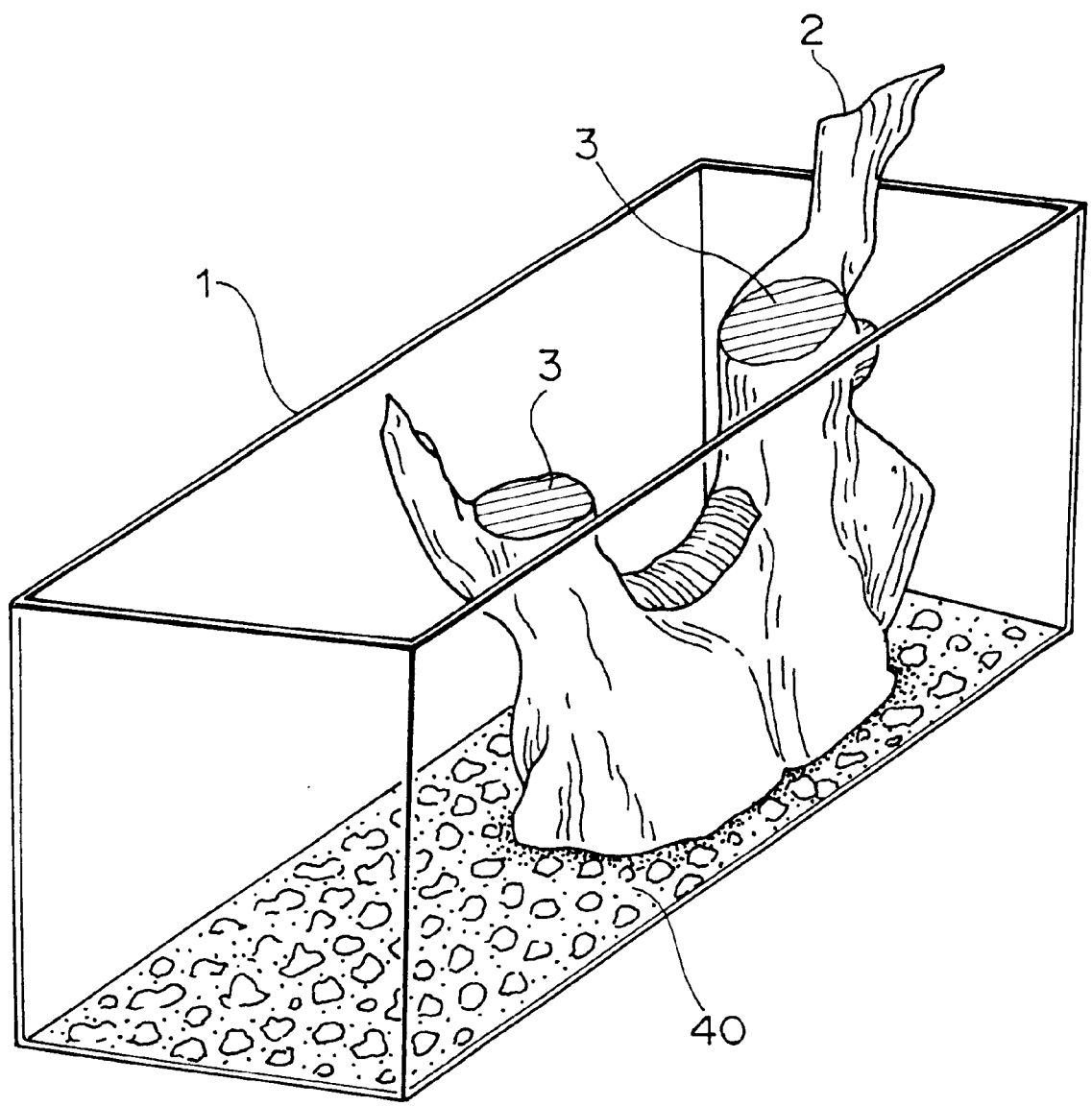
FIG. 2 is a perspective view illustrating support members placed on a recessed portion and a branched portion of the piece of a tree.

As the second step, as shown in FIG. 2, support members 3, which are water permeable and free to deform are arranged on the piece of a tree.

Incidentally, the support members 3 can be deformed as desired, so that the members can be adhered to the piece of a tree 2 that has a variety of shapes.

The support members 3 which are water permeable and can freely deform, and can comprise cloth-like raw materials can be employed. However, cotton-like raw materials made of fabrics such as synthetic resin fabrics, metal wires, or wood fibers are preferred.

Among the foregoing raw materials, the synthetic resin fabrics are advantageous in that they can freely deform and will never corrode while the fabrics made of metal wires are advantageous in that they have good support characteristics.

A consideration should inevitably be taken to prevent the support members 3 from dropping off the tree 2 when the support members 3 are arranged on the piece of a tree 2.

For this reason, the support members are typically placed on a portion of the piece of tree 2 with a recess or on a branched portion thereof.

However, a construction other than such a one is described later in embodiment 1.

Figure 3:
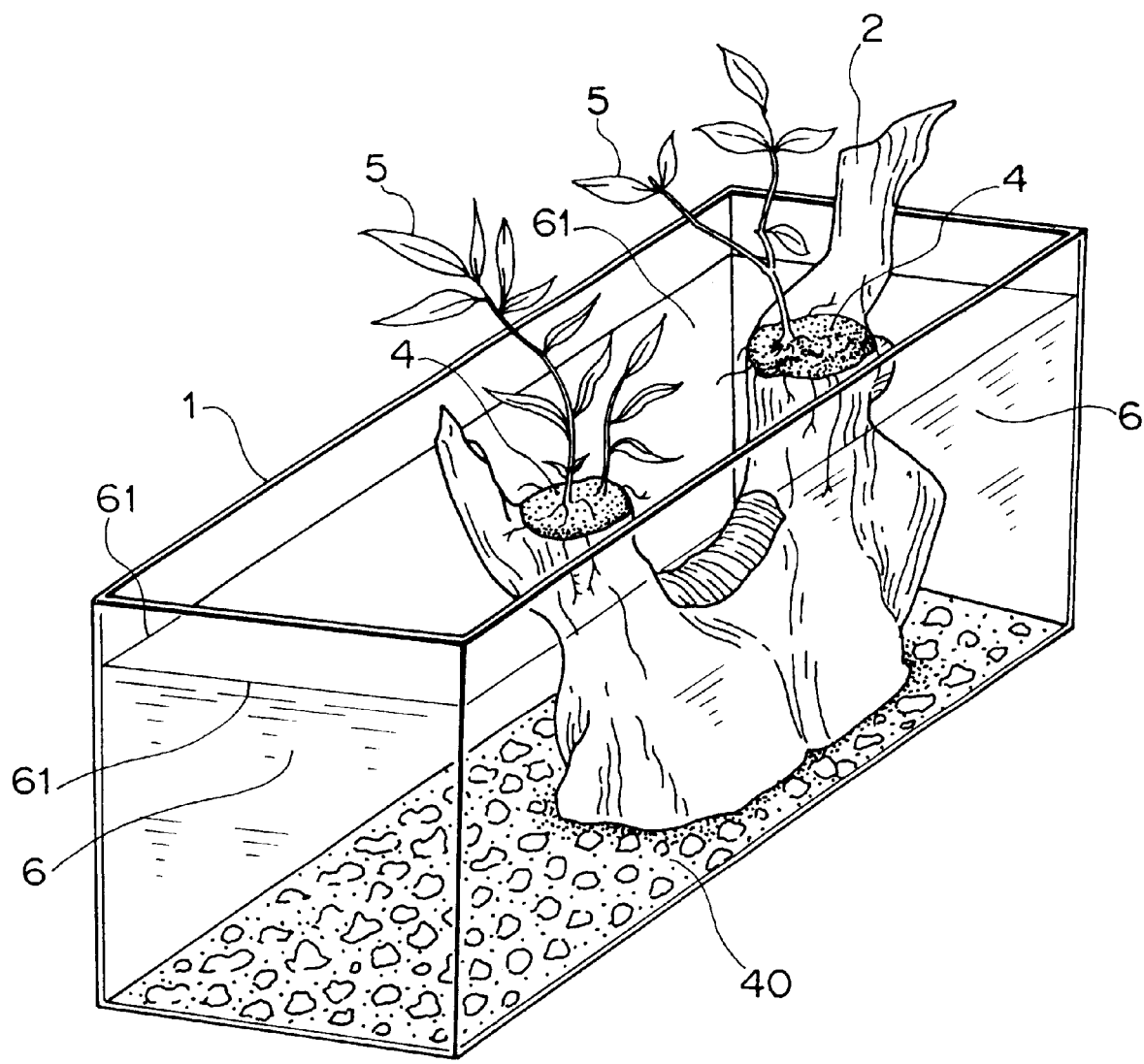
FIG. 3 is a perspective view illustrating plants, the roots of which are integrated with the soil, placed on the support members.

As the third step, as shown in FIG. 3, plants 5 are further placed on the support members, with the roots of the plants 5 integrated with the soil.

It is noted in FIG. 3 that the support members 3 are hidden because soil 4 and the plants 5 are placed thereon and are therefore covered.

After the third step has been completed, fertilizer is fed into the water 6 of the tank 1 as required, thereby allowing the plants 5 to grow on the piece of tree 2.

Figure 4:
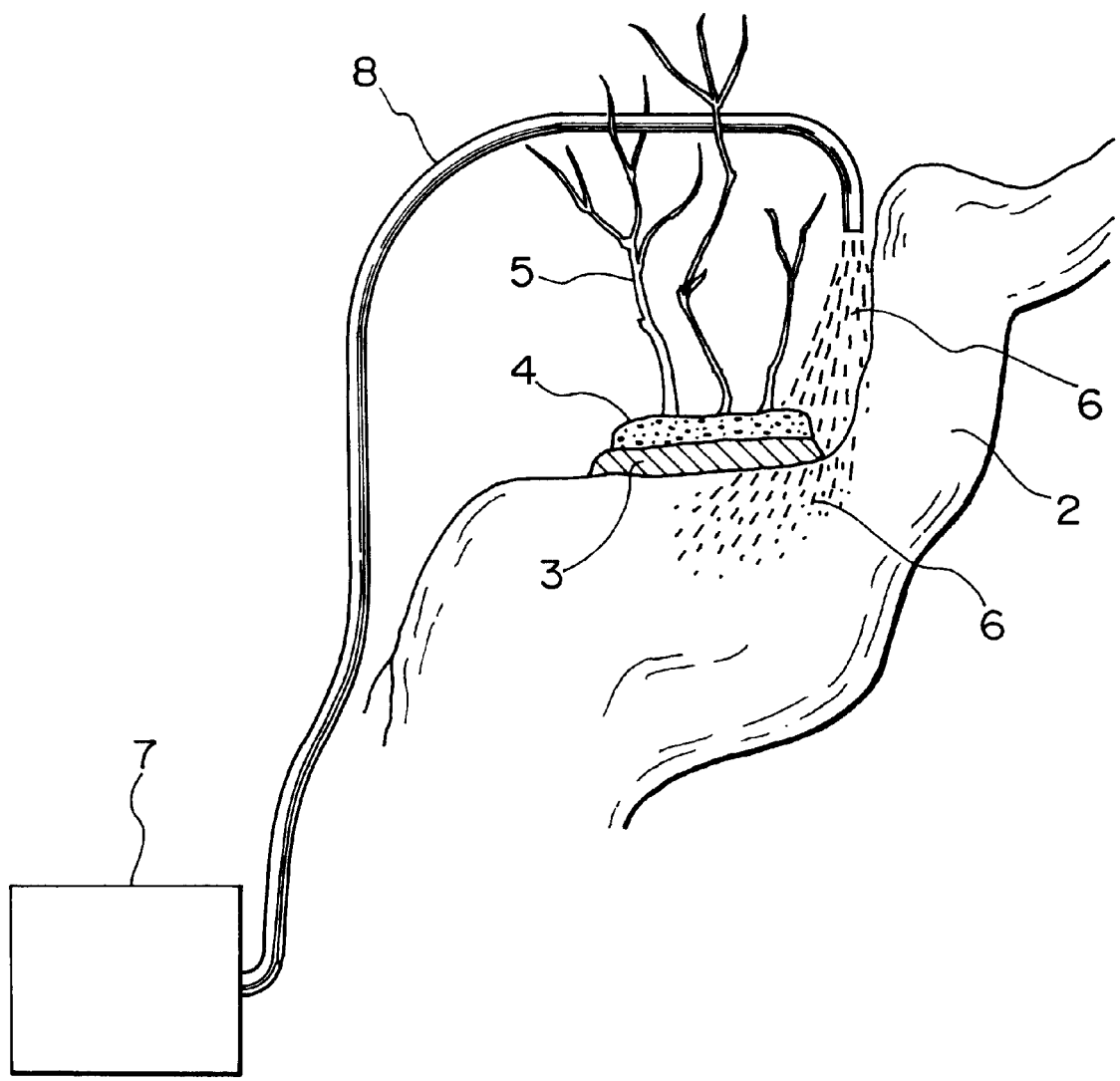
FIG. 4 is a schematic view illustrating the state in which water is supplied onto a piece of tree by means of a water supply pump and a pipe, and part of the water is contacted with a support member.
Figure 5:
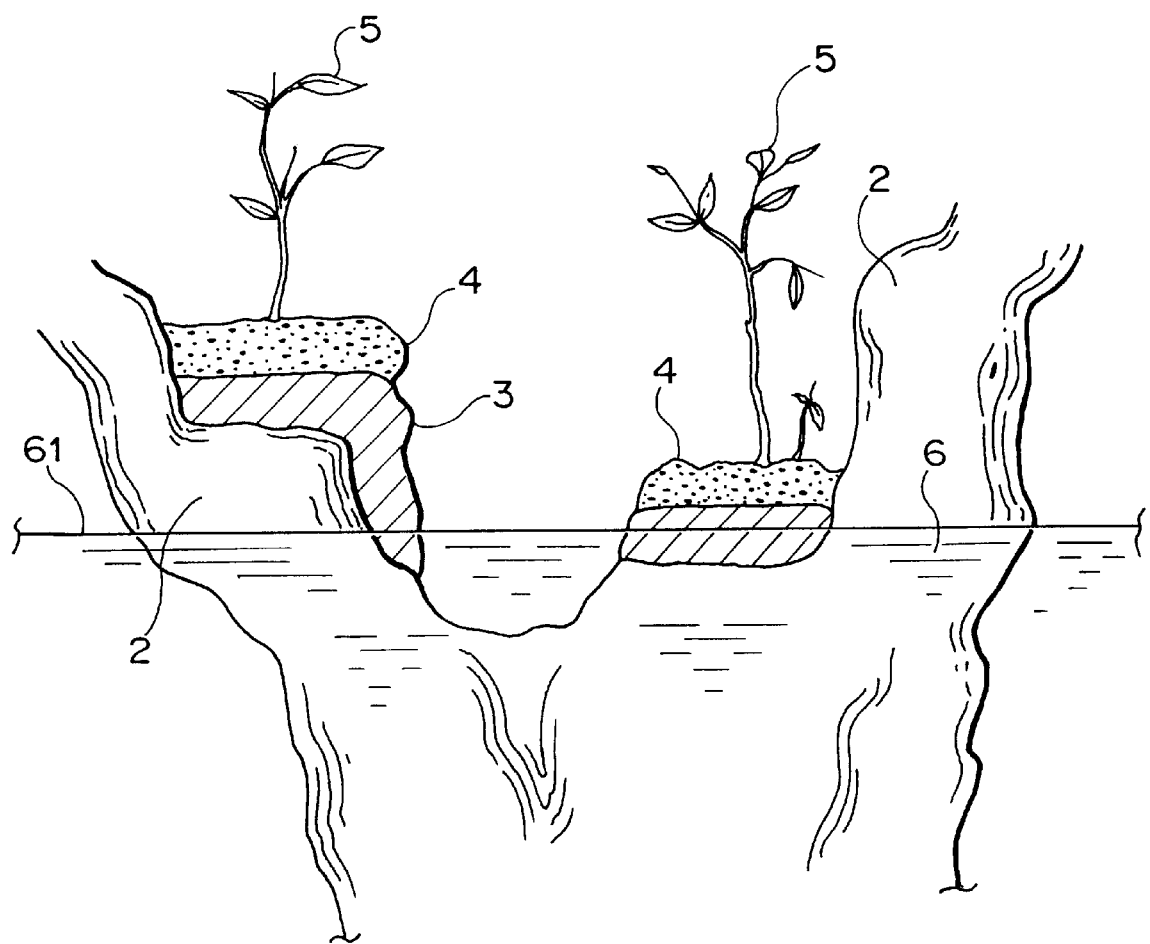
FIG. 5 is a side view illustrating soil placed on two support members at different positions, showing the positional relationship between a support member for placing soil at a higher position and a support member for placing soil at a lower position.

As shown in FIG. 4, the water 6 in the tank is typically provided by means of a water supply pump 7 and a pipe 8 and part of the poured water is directed so as to pass through the support members 3. In this case, the water that has passed through the support members will wet the support members 3 and reach the soil 4 by capillarity.

When neither the water supply pump 7 nor the pipe 8 is used, a water level 61 may be adjusted to reach the same level as that of the support members 3 as shown in FIG. 3. In this case, the water would reach the soil 4 due to the capillarity of the support members 3.

Incidentally, when the support members 3 are adhered to some portions of the piece of tree 2 and the levels of the soil 4 placed on the support members 3 are different from each other, the lower end of a support member 3 for placing the soil 4 thereon at a higher position is adapted to a position substantially at the same level as the position of a support member 3 for placing the soil 4 thereon at the lowermost position. In addition, the water level 61 is adjusted to come to a level of the support member 3 for placing the soil 4 thereon at the lowermost position. This makes it possible to cause the water to reach the support member for placing the soil at a higher position and thus to the level of the soil at a higher position by capillarity.

As indicated in the foregoing description, when a cotton-like raw material is used as the support members 3, the roots of the plants 5 will penetrate the material downwardly to reach the piece of tree 2, where the plants may take root in the piece of tree 2. This allows the plants to become firmly adhered to the piece of tree.

The method of the present invention according to the foregoing third step will allow the plants 5 to grow on the piece of tree 2 to cause the piece of tree to be integrated with the plants 5, thereby enabling one to enjoy the rich taste of nature.

The aforementioned apparatus is adapted to implement a mid-step before the second step shown in FIG. 2 or before the plants 5 are placed on the support members 3. Thus, the object of this apparatus is merely to implement the foregoing method.

EMBODIMENTS

Embodiment 1

As described above, it is necessary that the support members 3 should be prevented from dropping off a piece of a tree 2 when the former is arranged on the latter.

In the embodiment 1, as shown in FIG. 2, the support members are fixedly attached to the piece of tree with adhesive when the support members 3 are adhered to the piece of tree 2 in order to prevent the support members 3 from dropping off the piece of tree 2.

By using an adhesive as such, the support members 3 can be attached to a portion of the piece of tree 2 when a recessed portion is available or to a portion at the right side of the piece of tree 2 without being limited to a branched portion.

This makes it possible to grow the plants 5 at any desired portion of the tree and thus enjoy versatile ornamentation.

Embodiment 2

As shown in FIG. 3, there is a danger of the soil 4 which is placed on the support members 3 and exists together with the roots of the plants 5, dissolving in the water because it is liable to make contact with the water although this is not limited thereto.

It interferes with the appreciation of the plants when the soil dissolves in water.

Embodiment 3

Element 40 has been described as being a bottom sand. Alternatively and/or in addition thereto, element 40 can include a bottom soil having a sinter including an acid soil and a carbonate of an alkali metal, for example, $K_2CO_3$ or $Na_2CO_3$ or an alkali-earth metal, for example, $CaCO_3$ or $BaCO_3$. With this bottom soil, the pH value of the water can be kept within a constant range.

This is because a carbonate of an alkali metal or an alkali-earth metal can provide an alkali metal ion, for example, $K^+$ or $Na^+$, or an alkali-earth metal ion, for example, $Ca^{++}$ or $Ba^{++}$ and a carbonate ion $CO_3=$ in water, and may react with a hydrogen ion ($H^+$), and so relieve changing to an acid state in the water, caused by aquarium fish. Further, it may decompose a hydroxy ion ($OH^-$) and so relieve changing to an alkali state in the water, caused by growing aquatic plants.

The bottom soil 40 is preferably a sinter formed by heating a mixture of an acid soil and an alkali metal carbonate, an alkaline earth metal carbonate or a mixture thereof and water. The acid soil is preferably volcanic ash base soil. The sinter is formed by heating a mixture of an alkali metal carbonate, an alkaline earth metal carbonate or a mixture thereof, acid soil and water at a temperature of from about 60° C. to about 100° C. to a final water content of about 20% to about 30% by weight of the mixture. Sintering the mixture at about 60° C. to about 100° C. to a final water content of about 20% to about 30% by weight of the mixture provides a sintered soil with a high crushing strength which is easier to handle.

With the present invention, aquatic plants can be grown in the bottom soil comprising the above sinter, so that both ornamental plants and aquatic plants can be grown in the water tank.

In addition, the sinter of acid soil and a carbonate of alkali metal or alkali-earth metal may be used as soil 4 on support members 3.

In the embodiment 2, as a kind of soil that does not dissolve in water, a sintered soil mainly composed of volcanic ash base soil is typically used.

The sintered soil does not dissolve in contact with water, thus never interfering with appreciation by turning the water cloudy, as is the case with usual soil.

In particular, when the sintered soil, given a thickness of 1 cm, has a level of hardness that it cannot be crushed by a pressure of 1.5 $kgw/cm^2$, the roots of the plants can penetrate the soil to grow. Thus, the sintered soil is very convenient because the soil will not interfere with aesthetic appreciation as mentioned above and is available for growing the plants as well.

According to the present invention described above, it becomes possible to grow plants by hydroponic cultivation in a container with the plants integrated with a piece of a tree. In addition, a three-dimensional natural taste can be enjoyed.

Moreover, when roots of plants penetrate minute holes in the piece of tree, an effect can also be obtained such that the plants can absorb nutrients from the tree, and the tree and the plants can be integrated firmly with each other.

Furthermore, it becomes also possible to increase the appreciative effect by keeping fish such as tropical fish or gold fish in the tank.

As described above, the present invention provides such advantages as to provide great value.

What is claimed is:

1. A method for growing ornamental plants by hydroponic cultivation, comprising the steps of:

(1) arranging a piece of a tree in a water tank, (2) adhering support members to said tree, said support members being water permeable which are free to deform and comprising a cotton-like raw material comprised of a synthetic resin fabric, (3) placing plants on said support members, the roots of the plants being integrated with soil on the support members, wherein the soil integrated with the plant roots comprises a sinter prepared by heating at about 60° C. to about 100° C. a mixture of acid soil, a member selected from the group consisting of alkali metal carbonate, alkaline earth metal carbonates and mixtures thereof and water to a water content of about 20% to about 30% by weight of the sinter, and (4) supplying water to said support members so as to implement hydroponic cultivation of said plants on said tree.

2. The method for growing ornamental plants by hydroponic cultivation according to claim 1, wherein water is supplied to said support member by circulating water onto the piece of tree in a manner such that the water wets the support members.

3. The method according to claim 1, further including the step of laying a bottom soil at a bottom of the water tank such that aquatic plants can be grown in the bottom soil, the bottom soil comprising a sinter of a mixture comprising acid soil, water and a member selected from the group consisting of alkali metal carbonate, an alkaline earth metal carbonate and mixtures thereof.

4. The method for growing ornamental plants by hydroponic cultivation of claim 1 wherein the support members arranged on said piece of tree, are transparent in water and are free to deform.

5. The method for growing ornamental plants by hydroponic cultivation according to claim 1, wherein the support members are arranged on a portion of the piece of tree selected from the group consisting of a recess, a branched portion thereof and both of the foregoing.

6. The method for growing ornamental plants by hydroponic cultivation according to claim 1, wherein the support members are adhered to the tree with an adhesive.

7. The method for growing ornamental plants by hydroponic cultivation according to claim 1, wherein the sintered soil comprises volcanic ash base soil.

8. An apparatus for growing ornamental plants by hydroponic cultivation which comprises:

(1) a tank for holding water;

(2) a piece of a tree arranged in the tank;

(3) water permeable and freely deformable support members, for supporting plants with roots integrated with soil, arranged on the piece of a tree; and (4) a sintered soil arranged on the bottom of the tank, wherein the sintered soil comprises a mixture comprising acid soil, a member selected from the group consisting of an alkali metal carbonate, an alkaline earth metal carbonate and mixtures thereof and water sintered at a temperature from about 60° C. to about 100° C. to a final water content of from about 20% to about 30% by weight of the sinter.

9. A method for growing ornamental plants by hydroponic cultivation, comprising the steps of:

(1) arranging a piece of a tree in a water tank, (2) adhering support members to said tree, said support members being water permeable which are free to deform, wherein said step of adhering support members includes the step of adhering support members to a plurality of positions on the piece of tree, (3) placing plants on said support members, the roots of the plants being integrated with soil on the support members, (4) supplying water to said support members so as to implement hydroponic cultivation of said plants on said tree, and (5) adjusting a water level at the level of the support member located at the lowermost position on the piece of tree.

* * * * *